(12) United States Patent  
Rabhi

(10) Patent No.: US 8,056,514 B2  
(45) Date of Patent: Nov. 15, 2011

(54) PRESSURE DEVICE FOR A VARIABLE COMPRESSION RATIO ENGINE

(76) Inventor: Vianney Rabhi, Lyons (FR)

( * ) Notice: Subject to any disclaimer, the term of this patent is extended or adjusted under 35 U.S.C. 154(b) by 689 days.

(21) Appl. No.: 12/160,314

(22) PCT Filed: Jan. 26, 2007

(86) PCT No.: PCT/FR2007/000149  
§ 371 (c)(1), (2), (4) Date: Jul. 9, 2008

(87) PCT Pub. No.: WO2007/085739  
PCT Pub. Date: Aug. 2, 2007

(65) Prior Publication Data  
US 2010/0258074 A1 Oct. 14, 2010

Related U.S. Application Data

(60) Provisional application No. 60/762,870, filed on Jan. 30, 2006.

(30) Foreign Application Priority Data

Jan. 26, 2006 (FR) ..................................... 06 00714

(51) Int. Cl.  
*F02B 75/04* (2006.01)

(52) U.S. Cl. ..................................... 123/48 B; 123/78 F  
(58) Field of Classification Search ................ 123/48 R, 123/48 B, 78 R, 78 F  
See application file for complete search history.

(56) References Cited

U.S. PATENT DOCUMENTS

| | | |
|---|---|---|
| 6,354,252 B1 | 3/2002 | Rabhi |
| 6,601,551 B1 | 8/2003 | Rabhi |
| 7,013,849 B2 | 3/2006 | Rabhi |
| 2008/0017023 A1 | 1/2008 | Rabhi |

FOREIGN PATENT DOCUMENTS

| | | |
|---|---|---|
| FR | 2 763 097 A1 | 11/1998 |
| FR | 2 786 530 A1 | 6/2000 |
| WO | 03/008783 A1 | 1/2003 |
| WO | 2005/098219 A1 | 10/2005 |

*Primary Examiner* — Noah Kamen  
(74) *Attorney, Agent, or Firm* — Young & Thompson

(57) ABSTRACT

A pressure device maintains the raceways (48, 160 to 165) of the main moving components (3, 5, 7 and 40) of a variable compression ratio engine permanently in contact with one another and with the faces on which they rest in a cylinder case. The inventive device includes pressure elements which are solidly connected to the cylinder case (100) and which exert a pressure force on a control rack (7) having a toothed segment (75) formed by teeth (74). The pressure force is applied against a support surface (78) provided on the lower part of the rack (7).

40 Claims, 5 Drawing Sheets

PRESSURE DEVICE FOR A VARIABLE COMPRESSION RATIO ENGINE

BACKGROUND OF THE INVENTION

1. Field of the Invention

The present invention relates to a pressing device which maintains the raceways of the main moving components of a variable volumetric ratio engine permanently in contact with one another and with the faces on which they bear in the cylinder block.

2. Description of the Related Art

International patents WO98/51911, WO00/31377, WO03/008783, belonging to the Applicant, disclose various mechanical devices for a variable volumetric ratio engine.

It will be seen that international patent WO98/51911, in the name of the Applicant, describes a device which serves to improve the overall efficiency of internal combustion piston engines used at variable load and speed by adapting their effective displacement and/or their volumetric ratio during operation.

It will be observed from international patents WO00/31377 and WO03/008783, in the name of the Applicant, that the mechanical transmission device for a variable volumetric ratio engine comprises at least one cylinder in which there moves a piston which is secured, in its lower portion, to a transmission member cooperating, on the one hand, by means of one small-sized rack, with a rolling guide device and, on the other hand, by means of another large-sized rack, with a toothed wheel secured to a connecting rod, this making it possible to transmit the movement between said piston and said connecting rod.

Said mechanical transmission device for a variable volumetric ratio engine also comprises at least one control rack cooperating with the toothed wheel, means for fastening the piston to the transmission member that offer a clamping preload, connection means which make it possible to stiffen the teeth of the racks, and means for reinforcing and lightening the structure of the toothed wheel.

It will be noted that the minimum operating clearance between the toothings of the large-sized racks and those of the toothed wheel is fixed by the location of raceways formed on said large-sized racks and on said toothed wheel.

It will also be noted that the maximum operating clearance between the toothings of the large-sized racks and those of the toothed wheel is fixed by the difference between, on the one hand, the sum of the dimensions along a horizontal axis of the various moving components of the variable volumetric ratio engine, namely a synchronized roller forming part of the rolling guide device, the toothed wheel, the transmission member secured to the piston, and the control rack, and, on the other hand, the distance between the internal surfaces of the cylinder block on which, on one side of the engine, the synchronized roller and, on the other side of the engine, the control rack come to bear.

The maximum operating clearance between the toothings of the large-sized racks and the toothings of the toothed wheel can be adjusted in various ways which all have the disadvantage of requiring a high degree of precision in the production of the cylinder block and/or of adjustment shims.

This high degree of precision is required to obtain the smallest possible maximum operating clearance between the various raceways of the moving components of the engine so as to obtain the smallest possible maximum operating clearance between the toothings of the large-sized racks and those of the toothed wheel. Obtaining said smallest possible maximum operating clearance is necessary to limit the acoustic emissions of the engine which result particularly from the clearance between the teeth of the toothed wheel and the teeth of the racks with which said toothed wheel cooperates, the later clearance giving rise to hammering.

Equally, a high degree of precision is required for the production of the cylinder block and/or the adjustment shims in order to limit as far as possible the defects in parallelism between the various internal functional surfaces of said cylinder block. This is because said parallelism defects can lead to the moving components jamming inside said cylinder block when the engine is operating.

In addition to providing a high degree of precision for the cylinder block and/or the adjustment shims in order to limit the acoustic emissions of the engine and prevent any jamming of the moving components, it should also be ensured that the differences in temperature existing between said cylinder block and the moving components of the engine do not lead either to excessive clearances which can increase the acoustic emissions or to zero or negative clearances which can destroy the engine.

Specifically, the differences in temperature can lead to an expansion of the moving components which differs from that of the cylinder block, and hence to negative or positive variations in the operating clearance of the engine.

High temperature differences can also occur in operation between the top and bottom parts of the cylinder block. These differences can modify the orientation of the surface secured to the cylinder block along which the synchronized roller rolls.

Consequently, the maximum operating clearance between the various raceways of the moving components of the engine can vary during the stroke of the piston.

Another production difficulty stems from the need to reduce as far as possible the operating clearance between the jack piston which actuates the control rack and its bore in order to limit the acoustic emissions of the engine. This is because the jack piston comes to bear cyclically on either side of its bore because of the tilting of the rack which takes place under the thrust action of the toothings alternately above and below the bearing point of said control rack on the cylinder block, said bearing point being embodied for example by a ball joint connection as described in international patent application PCT/FR05/00584 belonging to the applicant.

Moreover, another defect relating to the operation of the control rack by the control jack will be noted: said operation takes place less quickly to increase the volumetric ratio than to lower it. This is due to the fact that the volumetric ratio is reduced by using the high forces applied to the control jack by the expansion of the gases, while the volumetric ratio is increased by using the less intense forces generated by the inertia of those parts of the engine subjected to a reciprocating movement.

SUMMARY OF THE INVENTION

With the aim of significantly reducing the acoustic level and to increase the efficiency of adjusting the compression ratio of the variable volumetric ratio engine and to facilitate the manufacture of the cylinder block, the pressing device according to the invention is distinguished from the prior art in that, according to one particular embodiment:

the manufacturing tolerances of the cylinder block are increased, thereby reducing its manufacturing cost;

the clearance between the raceways of the rolling guide device, the toothed wheel, the transmission member secured to the piston and the control rack, and also the clearance between the moving components and their bearing face on the cylinder block, always remain zero irrespective of the operating conditions of the engine, the effect of this being to limit the maximum clearance between the teeth of the gear system of the engine and the resulting acoustic emissions;

the risks of negative clearance between the moving components of the engine and the cylinder block that can lead to the destruction of the engine are eliminated;

the acoustic emissions arising from the fact that the piston of the jack comes cyclically into contact with its bore subsequent to the tilting of the control rack are eliminated;

the speed of movement of the control rack in the sense of increasing the volumetric ratio is increased.

The pressing device according to the present invention maintaining the raceways of the main moving components of a variable volumetric ratio engine permanently in contact with one another and with the faces on which they bear in a cylinder block comprises pressure means secured to the cylinder block that exert a pressure force on a control rack comprising a toothed sector, and the pressure force is applied to a bearing surface formed on said rack in its lower portion.

The pressing device according to the present invention comprises a bearing surface formed on the control rack in its lower portion that is placed sufficiently low so that the force resulting from the tangential force applied to the toothed wheel by the transmission member and from the pressure angle of the toothings on the one hand, and from the raceways on the other hand, is always situated above a bearing point (P) of the pressure means.

The pressing device according to the present invention comprises pressure means which consist of a helical spring housed in the internal wall of the engine block.

The pressing device according to the present invention comprises pressure means which consist of at least one Belleville washer housed in the internal wall of the engine block.

The pressing device according to the present invention comprises pressure means which consist of a hydraulic pressing ram housed in the internal wall of the engine block.

The pressing device according to the present invention comprises a hydraulic pressing ram which is a leaktight hydraulic capsule consisting of a flexible diaphragm.

The pressing device according to the present invention comprises a hydraulic pressing ram which comprises a piston which moves in a cylinder directly machined into the cylinder block.

The pressing device according to the present invention comprises a hydraulic pressing ram which comprises a piston which moves in a cylindrical sleeve fitted into the cylinder block.

The pressing device according to the present invention comprises a bottom of the cylinder of the hydraulic pressing ram that is formed by the cylinder block.

The pressing device according to the present invention comprises a bottom of the cylinder of the hydraulic pressing ram that is an add-on component bolted from outside the cylinder block into said cylinder block.

The pressing device according to the present invention comprises oil chambers in the various hydraulic pressing rams belonging to the engine that are interconnected by ducts produced within the mass of the cylinder block.

The pressing device according to the present invention comprises a pressure in the hydraulic pressing ram that is slaved to the operating conditions of the engine by means of a hydraulic unit.

The pressing device according to the present invention comprises a hydraulic unit which is an autonomous and independent assembly which can be installed at any point of the engine compartment of the vehicle and which is connected to the engine by at least one flexible hydraulic duct.

The pressing device according to the present invention comprises a hydraulic unit comprising at least one hydraulic pump.

The pressing device according to the present invention comprises a hydraulic unit comprising at least one pressure accumulator.

The pressing device according to the present invention comprises a hydraulic unit comprising at least one electrohydraulic valve.

The pressing device according to the present invention comprises a hydraulic unit comprising at least one sensor for measuring the pressure.

The pressing device according to the present invention comprises a hydraulic unit comprising at least one contactor slaved to the pressure.

The pressing device according to the present invention comprises a hydraulic unit comprising at least one hydraulic relief valve.

The pressing device according to the present invention comprises a hydraulic unit comprising at least one oil filter.

The pressing device according to the present invention comprises a hydraulic unit which is supplied with oil from the engine lubricating circuit.

The pressing device according to the present invention comprises a hydraulic unit comprising a main accumulator which is supplied by the hydraulic pump and which constitutes a high-pressure oil reserve.

The pressing device according to the present invention comprises a hydraulic unit comprising a slave accumulator which is connected to the hydraulic pressing ram and the average pressure of which is slaved to the operating conditions of the engine.

The pressing device according to the present invention comprises a control rack of which the vertical position with respect to the engine block is governed by a control device comprising a control jack consisting of an upper jack rod, of a lower jack rod, of a jack piston and of a control rod.

The pressing device according to the present invention comprises a hydraulic unit comprising a leak-compensating accumulator which is connected to a nonreturn valve of the control jack, said valve allowing hydraulic fluid to enter the body of the control jack.

The pressing device according to the present invention comprises a nonreturn valve of the control jack that is placed at the center of the upper rod of said jack, the inlet of said nonreturn valve being in communication with a chamber formed in a cylinder head of said control jack and in the continuation of the upper rod, said chamber being connected to the leak-compensating accumulator by one duct and the outlet of said nonreturn valve being connected to another duct formed in the jack piston of the control jack through which the control rod crosses said piston.

The pressing device according to the present invention comprises various chambers formed in the cylinder head of the control jacks of one and the same engine and in the continuation of the upper jack rods, these chambers being interconnected by ducts produced within the mass of said cylinder head.

The pressing device according to the present invention comprises a chamber formed in the cylinder head of the control jack and in the continuation of the upper jack rod, this chamber being connected to another chamber produced above the control rod and in said cylinder head by way of a duct formed within the mass of said cylinder head.

The pressing device according to the present invention comprises a jack piston of the control jack comprising a ring of which the inner surface matches the spherical shape of said jack piston and of which the outer surface is cylindrical.

The pressing device according to the present invention comprises pressure means secured to the cylinder block that exert a pressure force on the control rack by way of a bearing ball joint through which is exerted the pressure force which is applied to the bearing surface formed on said rack in its lower portion.

The pressing device according to the present invention comprises pressure means secured to the cylinder block that comprise an adjustable stop which makes it possible to adjust the maximum clearance between the raceways of the main moving components of the engine.

The pressing device according to the present invention comprises an adjustable stop which is a part bolted into the cylinder block and locked against rotation.

The pressing device according to the present invention comprises a hydraulic pump which is a single radial piston pump comprising a piston actuated translationally along its longitudinal axis in one direction by a pump drive eccentric and in the other direction by a return spring.

The pressing device according to the present invention comprises a pump drive eccentric which is formed at the end of one of the camshafts which serve to open and close the valves of the engine.

The pressing device according to the present invention comprises a pump drive eccentric which comprises a ball bearing or roller bearing of which the inner cage is mounted on said eccentric and of which the outer cage is directly or indirectly in contact with the end of the piston of the pump.

The pressing device according to the present invention comprises a pump drive eccentric which acts on the piston of the pump by way of a tappet housed in a bore.

The pressing device according to the present invention comprises a single radial piston pump which comprises a pump chamber communicating, firstly, with the outlet of an intake nonreturn valve of which the inlet is connected to the pressurized lubricating circuit of the engine, secondly, with the inlet of a delivery nonreturn valve of which the outlet is connected to the main accumulator and, thirdly, with the pressurized lubricating circuit of the engine by way of a duct which can be closed off by a discharge distributor.

The pressing device according to the present invention comprises a discharge distributor which comprises at least one fluid passage groove and which can move in a bore along its longitudinal axis such that one of the ends of said distributor cooperates with a spring which tends to maintain said distributor in the closed position, while the other end of said distributor cooperates with a pressure transmission rod which tends to maintain said distributor in the open position by exerting a force on said distributor, said force being proportional to the pressure prevailing in the main accumulator.

The pressing device according to the present invention comprises a pressure transmission rod which comprises a first end which is in contact with the discharge distributor and tends to maintain it in the open position, while the second end terminates in a pressure chamber connected to the main accumulator by means of a duct.

The pressing device according to the present invention comprises a discharge distributor which comprises a locking device cooperating with two locking grooves respectively enabling said distributor to be maintained in the fully open or fully closed position, said locking device being maintained in one or other of said grooves by a locking spring.

BRIEF DESCRIPTION OF THE DRAWING FIGURES

The description which follows with reference to the appended drawings, which are given by way of non-limiting examples, will allow a better understanding of the invention, the features that it offers and the advantages that it can provide:

DETAILED DESCRIPTION OF THE INVENTION

Figure 1:
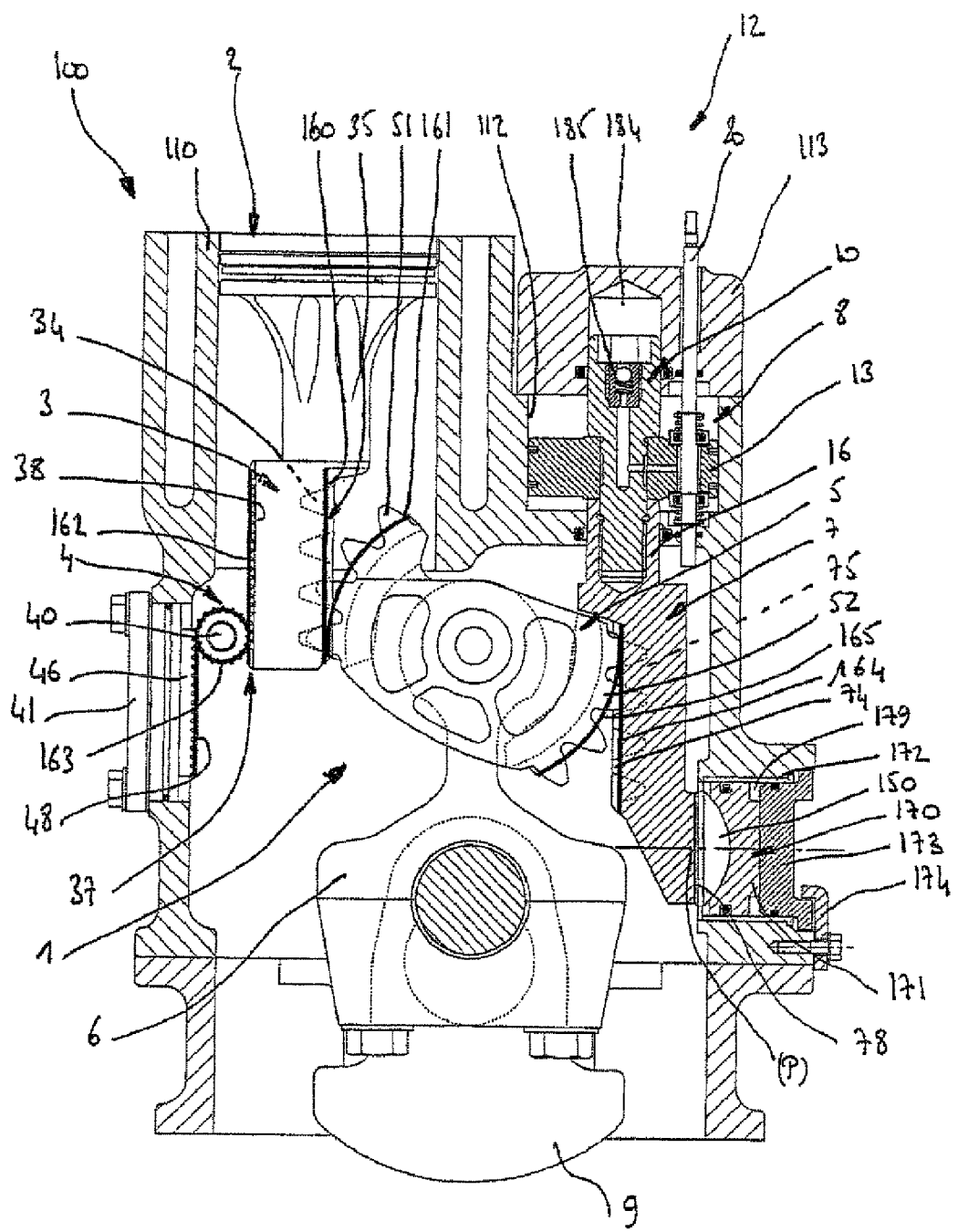
FIG. 1 is a schematic sectional view illustrating the raceways of the main moving components of a variable volumetric ratio engine in its cylinder block.

FIG. 1 shows an engine block 100 which comprises at least one cylinder 110, in which a piston 2 moves by means of a transmission device 1, and pressure means which make it possible to maintain in position the main moving components of a variable volumetric ratio engine in their cylinder block.

In the lower portion of the piston 2, the mechanical transmission device 1 comprises a transmission member 3 secured to said piston and cooperating, on the one hand, with a rolling guide device 4 and, on the other hand, with a toothed wheel 5.

The toothed wheel 5 cooperates with a connecting rod 6 connected to a crankshaft 9 in order to transmit the movement between the piston 2 and said crankshaft.

On the opposite side to the transmission member 3, the toothed wheel 5 cooperates with another rack, termed control rack 7, of which the vertical position with respect to the engine block 100 is governed by a control device 12 comprising a control jack 8, the jack piston 13 of which is guided in a jack cylinder 112 formed in the engine block 100.

The jack cylinder 112 is closed in its upper portion by a jack cylinder head 113 which is bolted onto the engine block 100. There may be provided one cylinder head 113 for each jack cylinder 112 or a cylinder head 113 which is common to all the jack cylinders 112 of a multicylinder engine.

The transmission member 3 secured to the piston 2 is provided on one of its faces with a large-sized rack 35 of which the teeth 34 cooperate with the teeth 51 of the toothed wheel 5, a first raceway 160 being formed on the first large-sized rack 35 of the transmission member 3, while a second raceway 161 is formed on the toothed wheel 5.

The transmission member 3 comprises, on the opposite side to the large-sized rack 35, another rack 37 of which the small-sized teeth 38 cooperate with the teeth of a roller 40 of the rolling guide device 4, said transmission member 3 also comprising a second raceway 162 on said rack 37 that cooperates with a raceway 163 formed on the roller 40.

The engine block 100 is secured to a support 41 comprising racks 46 which synchronize the movement of the roller 40 with that of the piston 2, and a raceway 48 cooperating with the raceway 163 of the roller 40.

The control rack 7 of which the vertical position with respect to the engine block 100 is governed by a control device 12 comprising a control jack 8 which consists of an upper jack rod 10, of a lower jack rod 16, of a jack piston 13 and of a control rod 20.

The control rack 7 comprises teeth 74 which cooperate with the teeth 52 of the toothed wheel 5 and a raceway 164 which cooperates with a raceway 165 belonging to the toothed wheel 5.

In its lower portion and below the toothed sector 75 consisting of teeth 74, the control rack 7 comprises a bearing surface 78 which is placed sufficiently low so that the force resulting, on the one hand, from the tangential force applied to the toothed wheel 5 by the transmission member 3 and from the pressure angle of the toothings 34, 74, 51, 52 and, on the other hand, from the force exerted by the raceways 164 and 165 is always situated above a bearing point P of the pressure means.

The pressure means secured to the cylinder block 100 exert a pressure force on the control rack 7 by way of a bearing ball joint 150 through which is exerted the pressure force which is applied to the bearing surface 78 formed on said rack 7 in its lower portion.

The pressure means secured to the cylinder block 100 can comprise an adjustable stop which makes it possible to adjust the maximum clearance between the raceways 48, 160 to 165 of the main moving components 3, 5, 7 and 40 of the engine.

The adjustable stop can be a part which is bolted and locked against rotation in the cylinder block 100. The adjustable stop can be locked against rotation, for example, by a locknut, by adhesive bonding, by wedging or by a "Nylstop"-type nut.

The pressure means can consist of a helical spring housed in the internal wall of the engine block 100.

The pressure means can consist of at least one Belleville washer housed in the internal wall of the engine block 100.

The pressure means can consist of a hydraulic pressing ram 170 housed in the internal wall of the engine block 100.

The hydraulic pressing ram 170 can be a leaktight hydraulic capsule consisting of a flexible diaphragm.

The hydraulic pressing ram 170 can comprise a piston 171 which moves in a cylinder directly machined into the cylinder block 100.

The hydraulic pressing ram 170 comprises a piston 171 which moves in a cylindrical sleeve 172 fitted into the cylinder block 100.

The bottom of the cylinder of the hydraulic pressing ram 170 can be formed by the cylinder block 100.

The bottom of the cylinder of the hydraulic pressing ram 170 is a component 173 which is added on and bolted from outside the cylinder block 100 and into said cylinder block 100.

According to one particular embodiment, the cylinder bottom 173 of the hydraulic pressing ram 170 constitutes an adjustable stop which makes it possible to adjust the maximum clearance between the raceways 48, 160 to 165 of the main moving components 3, 5, 7 and 40 of the engine, said cylinder bottom 173 then being locked against rotation in the cylinder block 100 using locking means.

The locking means can consist of a part 174 which cooperates with the cylinder bottom 173 and which is bolted into the cylinder block 100.

The various hydraulic pressing rams 170 belonging to the engine have chambers 179 which are interconnected by ducts produced within the mass of the cylinder block 100.

The pressure prevailing in each hydraulic pressing ram 170 is slaved to the operating conditions of the engine by means of a hydraulic unit 200.

The hydraulic unit 200 is an autonomous and independent assembly which can be installed either inside the engine block 100 or at any point of the engine compartment of the vehicle and connected to the engine by at least one flexible hydraulic duct. According to a variant embodiment, the various components of the hydraulic unit 200 can be wholly or partly housed in the oil sump of the engine or distributed at various locations inside or outside said engine.

Figure 2:
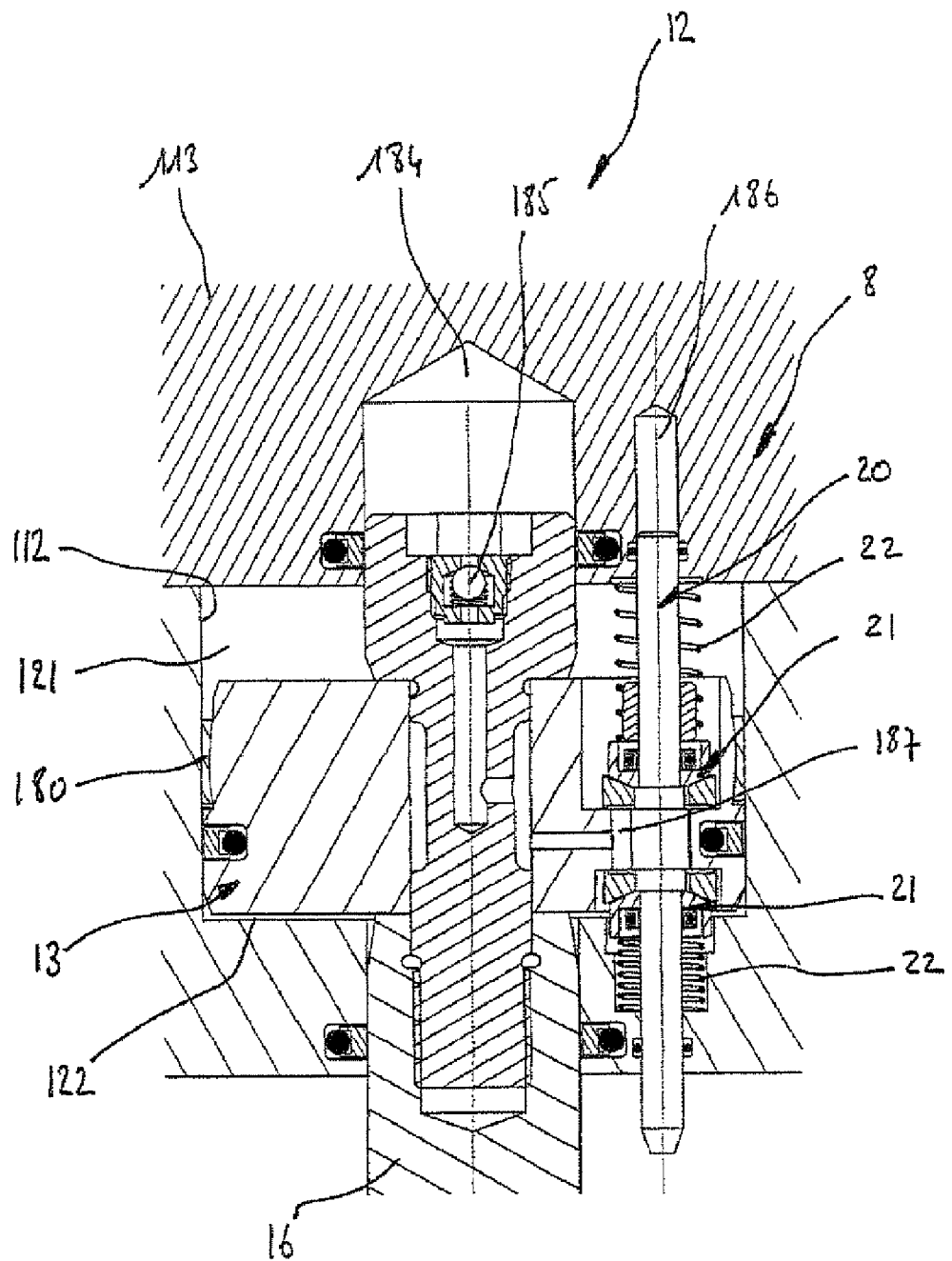
FIG. 2 is a sectional view representing the control device of the variable volumetric ratio engine in its cylinder block.
Figure 3:
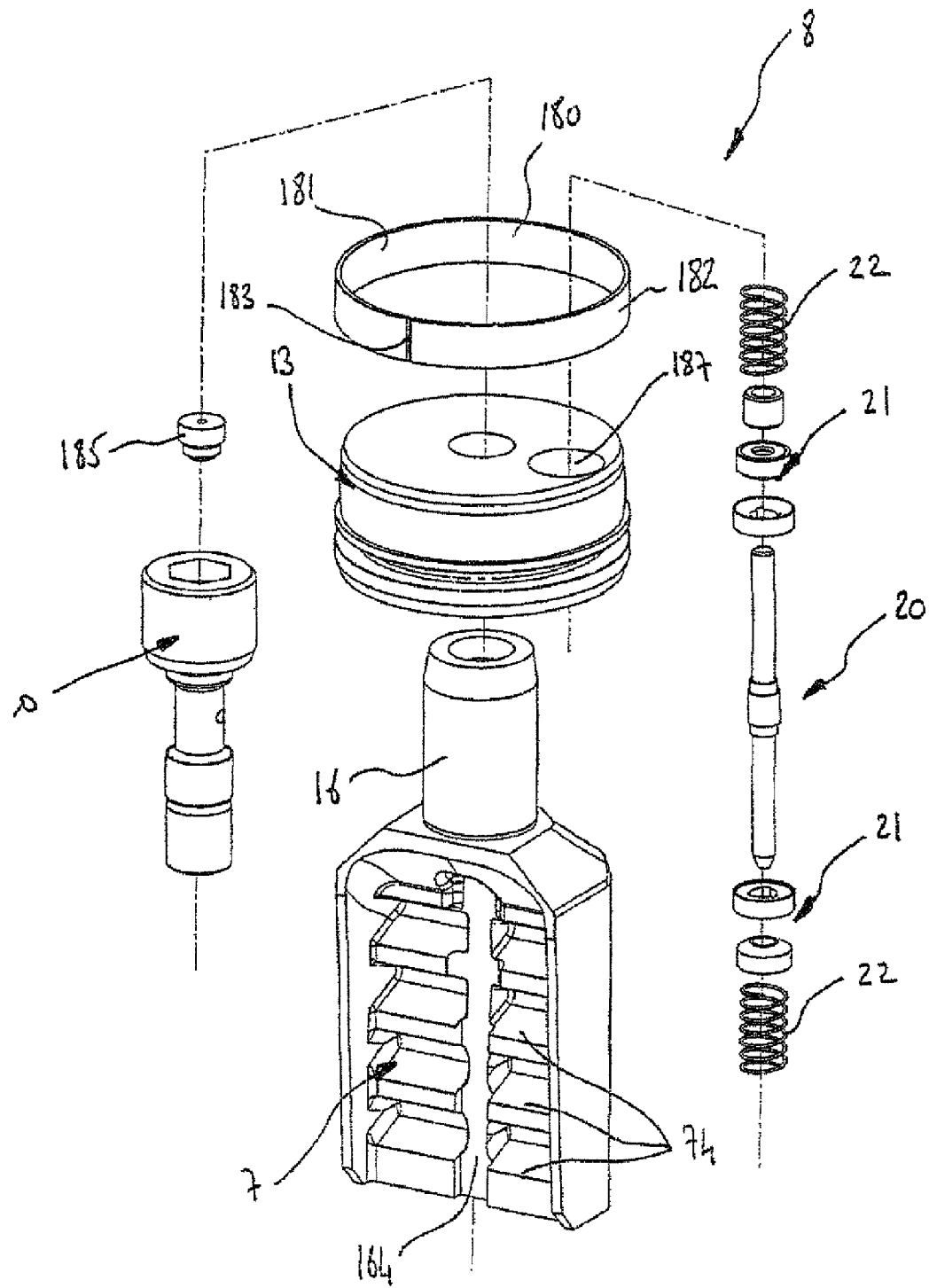
FIG. 3 is an exploded perspective view showing the arrangement of the jack piston of the control device with the control rack of the variable volumetric ratio engine in its cylinder block.

FIGS. 2 and 3 represent the control device 12 of the variable volumetric ratio engine, of which the upper jack rod 10 of the control jack 8 cooperates with the lower jack rod 16 of the control rack 7.

The jack piston 13 comprises a swivel ring 180 of which the inner surface 181 matches the spherical shape of said jack piston, while said ring has an outer surface 182 having a cylindrical profile.

The swivel ring 180 comprises a split 183 to facilitate the mounting of said ring around the jack piston 13.

The upper jack rod 10 of the control jack 8 cooperates in the continuation thereof and in a sealed manner with a chamber 184 formed in the cylinder head 113 of the jack cylinder 112 of each control device 12 of the engine.

The chamber 184 formed in the cylinder head 113 can be connected to another chamber 186 produced within the mass of the cylinder head 113 and above the control rod 20 of the control jack 8 by way of a duct drilled into the mass of said cylinder head 113.

The upper jack rod 10 can comprise, in its internal portion and at its center, a leak-compensating nonreturn valve 185 of which the inlet is in communication with the chamber 184 formed in the cylinder head 113 of the control jack 8, while the outlet of said nonreturn valve 185 is connected to a duct 187 formed in the jack piston 13 of the control jack 8.

The chamber 184 is connected to a leak-compensating accumulator 209 of a hydraulic unit 200.

The duct 187 communicates at the level of the control rod 20, by way of valves 21 maintained on their seat by a spring 22, either with an upper chamber 121 or with a lower chamber 122 of the control jack 8 which are respectively situated above and below the jack piston 13.

The various chambers 184 formed in the cylinder head 113 of the control jacks 8 of one and the same engine and in the continuation of the upper jack rods 10 of said jacks are interconnected by ducts produced within the mass of the cylinder head 113.

Figure 4:
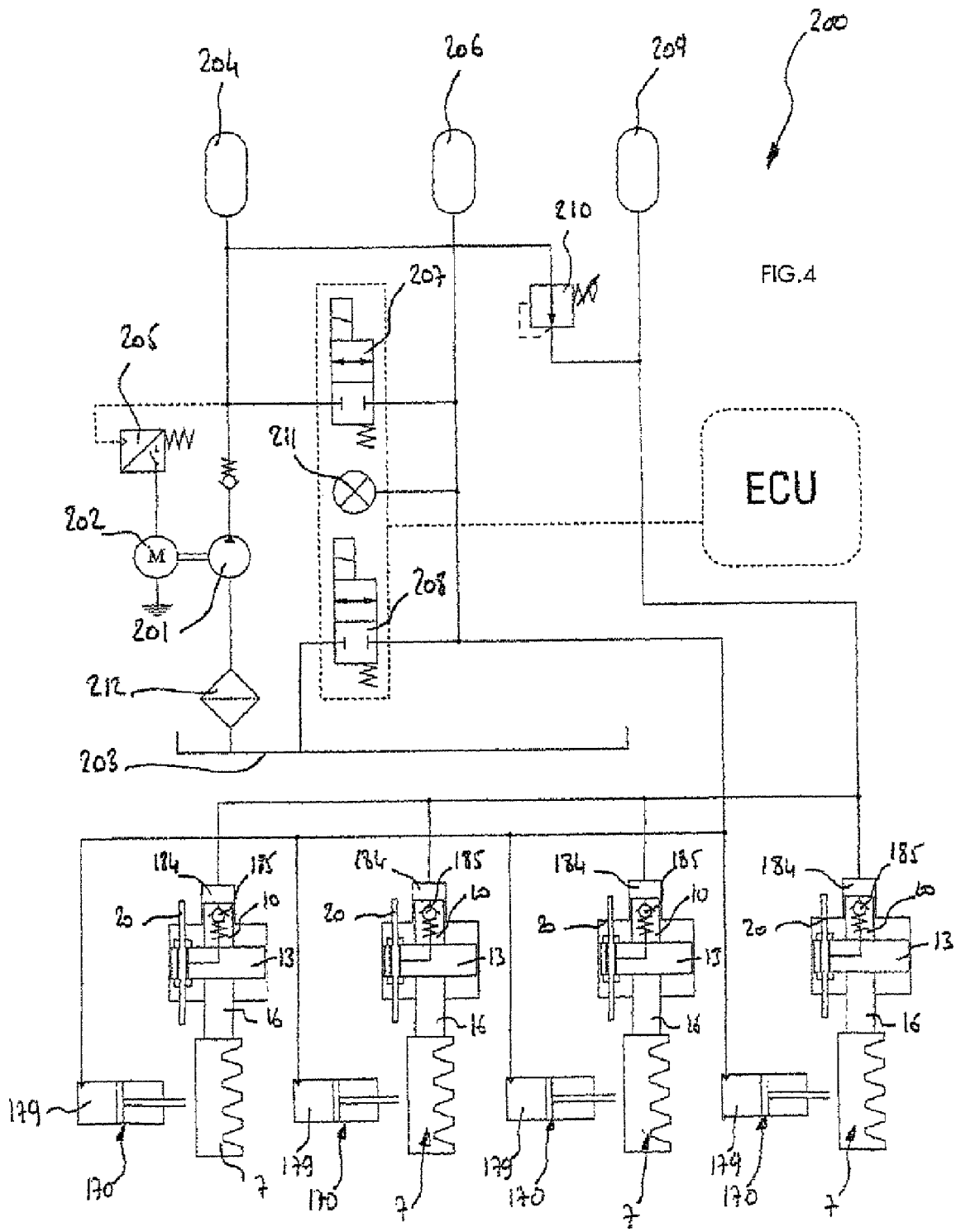
FIG. 4 is a view illustrating the basic operating scheme of the hydraulic unit intended to control the pressing device of the variable volumetric ratio engine in its cylinder block.

FIG. 4 shows a scheme illustrating a hydraulic unit 200 for maintaining a hydraulic pressure in each hydraulic pressing ram 170 of the pressing device according to the present invention.

The hydraulic unit 200 comprises a hydraulic pump 201 moved by an electric motor 202 which sucks in oil from the engine lubricating oil sump 203 and delivers it into a main accumulator 204 in order to permanently maintain an oil reserve under high pressure.

The electric motor 202 which drives the hydraulic pump 201 is activated by means of a contactor 205, known per se, slaved to the pressure which prevails in the main accumulator 204.

The hydraulic pump 201 can be driven, for example, by the internal combustion engine via transmission means, or by a rotary or linear electric motor. The hydraulic pump 201 can be a vane pump, a gear pump, a radial piston pump or an axial piston pump.

The contactor 205 is designed to activate the electric motor 202 below a certain pressure, termed "minimum pressure", and to deactivate said electric motor 202 above a certain pressure, termed "maximum pressure", such that the pressure prevailing in the main accumulator 204 always remains between two predetermined values.

The respective chambers 179 of the various hydraulic pressing rams 170 of the engine are commonly connected to a slave accumulator 206 such that the pressure prevailing in said slave accumulator 206 is identical to that prevailing in the chambers 179 of said hydraulic pressing rams 170.

The minimum pressure required in the chambers 179 of the hydraulic pressing rams 170, in order to maintain the raceways 48, 160 to 165 of the main moving components 3, 5, 7 and 40 of the engine permanently in contact with one another and with the faces on which they bear in the engine block 100, is variable according to the operating conditions of said engine, that is to say according to the load and the speed of said engine.

In order to reduce engine friction and wear, it is advantageous to provide a pressure in the chambers 179 of the hydraulic pressing rams 170 that is close to the minimum pressure required while always remaining at least equal to or above the latter.

For this reason, the pressure which prevails in the slave accumulator 206 is controlled by an engine management system ECU according to the operating conditions of said engine via the hydraulic unit 200.

To this end, the engine management system ECU permanently calculates the pressure value required for the slave accumulator 206 according to the load and speed of said engine.

Taking into account the operating conditions of the engine, if the pressure, the value of which is transmitted to the engine management system ECU by a pressure sensor 211, in the slave accumulator 206 is too low, a hydraulic charge valve 207 transfers high-pressure oil from the main accumulator 204 toward the slave accumulator until the pressure of said slave accumulator 206 is raised to the desired value.

If the pressure in the slave accumulator 206 is too high, a hydraulic discharge valve 208 transfers oil from the slave accumulator 206 toward the engine lubricating oil sump 203 until the pressure of said slave accumulator 206 is lowered to the desired value. When the engine operates under stabilized load and at stabilized speed, the charge 207 and discharge 208 valves remain closed.

The hydraulic unit 200 comprises at least one oil filter 212 placed at the inlet or outlet of the hydraulic pump 201.

The stiffness of the slave accumulator 206, that is to say its pressure variation according to the variation in the volume of the oil which it contains, is calculated such that the geometric defects of the engine which cause a cyclic variation in the volume of the chambers 179 of the hydraulic pressing rams 170 make the pressure in the slave accumulator 206 fluctuate only within reasonable limits.

Another function of the hydraulic unit 200 is to maintain a "boost" pressure at the inlet of the nonreturn valve 185 of the control jacks 8 so as to compensate for any loss of hydraulic fluid from said control jacks 8 due to leaks on the one hand, and so as to maintain a minimum operating pressure in said control jacks 8 on the other hand.

The minimum operating pressure is necessary to reduce the effects of oil compressibility detrimental to the precision of the control jacks 8 on the one hand, and to avoid any cavitation phenomena which generate noise and destroy internal components of said jacks on the other hand.

For that purpose, the hydraulic unit 200 comprises a leak-compensating accumulator 209 connected with the inlet of the nonreturn valve 185 of the control jacks 8.

The pressure of the leak-compensating accumulator 209 is considerably less than that of the main accumulator 204 and is constantly maintained, by a hydraulic relief valve 210, known per se, above a predefined minimum value.

If the pressure of the leak-compensating accumulator 209 comes to fall below said predefined minimum value, the hydraulic relief valve 210 transfers hydraulic fluid from the main accumulator 204 toward said leak-compensating accumulator 209 until the predefined minimum pressure has been reached in said leak-compensating accumulator 209.

In the case where the nonreturn valves 185 are placed at the center of the upper jack rod 10 of the control jacks 8 of said engine, a chamber 184 is formed in the cylinder head 113 of the control jacks 8, said chamber being directly connected to the leak-compensating accumulator 209.

This particular arrangement makes it possible to add, to the inertia forces of the engine which are used to increase the compression ratio of said engine, a thrust force on the upper jack rod 10 of the control jacks 8 corresponding to the pressure of the compensating accumulator 209 multiplied by the cross section of said upper jack rod 10 of the control jacks 8.

This configuration makes it possible to considerably improve the speed of the control jack 8 during operations aimed at increasing the compression ratio of the engine.

In this latter configuration, the output pressure of the hydraulic relief valve 210 which regulates the minimum pressure of the compensating accumulator 209 can be slaved to the compression ratio of the engine.

It will be noted that the main accumulator 204, the slave accumulator 206 and the compensating accumulator 209 can be of the diaphragm and compressed gas type or of the piston and spring type.

Figure 5:
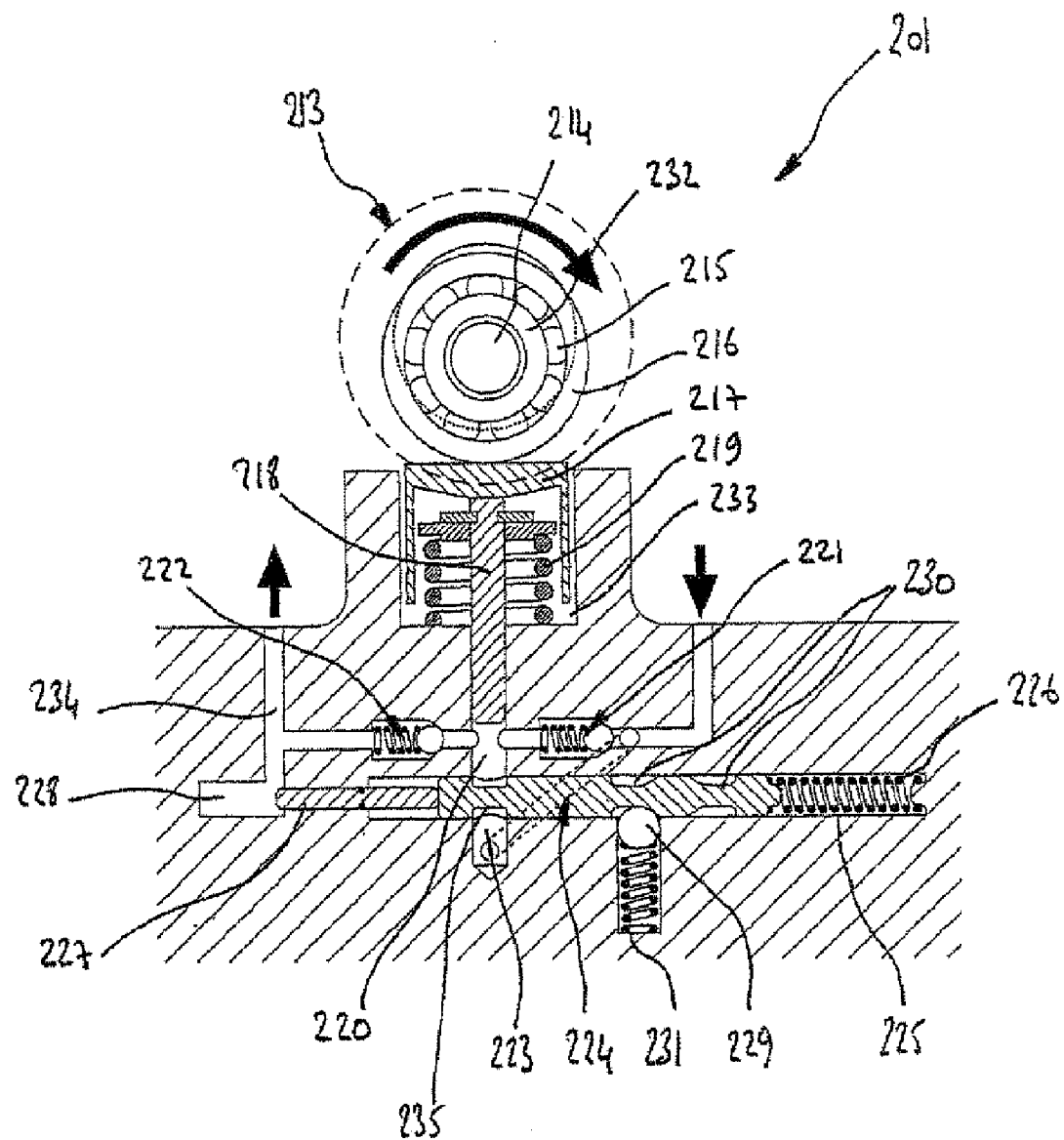
FIG. 5 is a view representing an exemplary embodiment of the hydraulic pump of the hydraulic unit intended to control the pressing device of the variable volumetric ratio engine in its cylinder block.

FIG. 5 represents an exemplary embodiment of the hydraulic unit 200, of which the electric motor 202 which actuates the hydraulic pump 201 can advantageously be replaced by a mechanical connection 213.

This mechanical connection 213 can consist of a pump drive eccentric 214 formed, for example, at the end of one of the camshafts which serve to open and close the valves of the engine.

The pump drive eccentric 214 can be provided with a ball bearing or roller bearing 215 comprising, on the one hand, an inner cage 232 which is mounted on said eccentric and, on the other hand, an outer cage 216 which is maintained directly or indirectly in contact with the end of a piston 218 of the hydraulic pump 201.

For this purpose, it will be noted that the outer cage 216 of the bearing 215 is maintained in contact with a pump tappet 217 housed in a bore 233 and which transmits its sinusoidal reciprocating movement to the pump piston 218 of the hydraulic pump 201.

The hydraulic pump 201 is a single radial piston pump 218 which is actuated translationally along its longitudinal axis, in one direction by the pump drive eccentric 214 and in the other direction by a return spring 219.

On account of its kinematics, the pump piston 218 continuously varies the volume of a pump chamber 220 into which open, on the one hand, the outlet of an intake nonreturn valve 221 of which the inlet is connected to the pressurized lubricating circuit of the engine, and, on the other hand, the inlet of a delivery nonreturn valve 222 of which the outlet is connected to the main accumulator 204.

The pump chamber 220 is also connected to the pressurized lubricating circuit of the engine by a duct 223 which can be closed off by a discharge distributor 224.

The discharge distributor 224 can be of cylindrical shape and can move in a bore 225 along a longitudinal axis under the effect of two opposing forces, said discharge distributor comprising at least one fluid passage groove 235.

The first force is exerted on one of the ends of the discharge distributor 224 by a spring 226 and tends to maintain said distributor in the closed position.

The second force is proportional in intensity to the pressure prevailing in the main accumulator 204 and is exerted on the other end of the discharge distributor 224 by a pressure transmission rod 227 of cylindrical shape which tends to maintain said distributor in the open position.

It will be noted that the pressure transmission rod 227 terminates in a pressure chamber 228 connected to the main accumulator 204 by means of a duct 234.

A locking ball 229, or any other locking means, is caused to cooperate with locking grooves 230 produced in the body of the discharge distributor 224 in order to maintain said distributor in the fully open or fully closed position.

The locking ball 229 is maintained in one or other of said grooves 230 by a locking spring 231 which exerts on said locking ball 229 a force such that said ball is only able to come out of one or other of said grooves above a certain force exerted on said ball by the discharge distributor 224 when the latter tends to move along its longitudinal axis.

When the discharge distributor 224 is in the closed position, the pump sucks in oil from the engine lubricating circuit via its intake valve 221 and distributes it toward the main accumulator 204 via its delivery valve 222.

As is clearly apparent from FIG. 5, when the discharge distributor 224 is in the open position, the pump is inoperative and no longer produces any effect, the hydraulic fluid being sucked in then delivered via the distributor into one and the same channel, that is to say the intake from the engine lubricating circuit.

The setting and the stiffness of the springs 226, 231 which exert a pressure on the end of the discharge distributor 224, on the one hand, and on the locking ball 229, on the other hand, and also the cross section of the pressure transmission rod 227 are calculated such that if the pressure is insufficient or excessive in the main accumulator 204, the balance of the forces is disrupted between that exerted by said distributor spring 226 on said discharge distributor 224, that exerted on the same distributor by the pressure transmission rod 227 and that exerted by the locking ball 229 which tends to maintain the discharge distributor 224 in position.

In the case where the discharge distributor 224 is in the open position or where the pressure in the main accumulator 204 becomes insufficient, the locking ball 229 lifts and releases said distributor, which automatically places itself in the closed position. This results from the fact that the force exerted by the pressure transmission rod 227 has become insufficient to counteract the force exerted by the distributor spring 226 minus the retention force applied to the discharge distributor 224 by the locking ball 229. The hydraulic pump 201 then supplies the main accumulator 204 with hydraulic fluid.

In the case where the discharge distributor 224 is in the closed position or where the pressure in the main accumulator 204 reaches its desired maximum value, the locking ball 229 lifts and releases said distributor, which automatically places itself in the open position. This results from the fact that the force exerted by the pressure transmission rod 227 has become greater than that exerted by the distributor spring 226 plus the retention force applied to the discharge distributor 224 by the locking ball 229.

According to this arrangement, the setting and the stiffness of the locking spring 231, the diameter of the locking ball 229 and the profile of the locking grooves 230 make it possible to define the minimum pressure and the maximum pressure which will be automatically maintained in the main accumulator 204 by the hydraulic pump 201.

The hydraulic pump 201, comprising its tappet 217, its piston 218, its valves 221, 222, its discharge distributor 224, its locking ball 229 and its pressure transmission rod 227, can constitute an assembly fastened to the cylinder head of the engine at the end of one of the camshafts which serve to open and close the valves of the engine.

It must moreover be understood that the foregoing description has been given purely by way of example and that it in no way limits the field of the invention from which there would be no departure if the implementation details described were replaced by any other equivalent.

The invention claimed is:

1. A pressing device which maintains raceways (48, 160 to 165) of main moving components (3, 5, 7, 40) of a variable volumetric ratio engine permanently in contact with one another and with faces on which they bear in a cylinder block, comprising:
    means for pressure secured to the cylinder block (100) that exert a pressure force on a control rack (7) comprising a toothed sector (75) having teeth (74), and pressure force is applied to a bearing surface (78) formed on a lower portion of said rack (7), said bearing surface (78) formed on the lower portion of the control rack (7) being placed sufficiently low so that a force resulting from tangential force applied to a toothed wheel (5) by a transmission member (3) and from a pressure angle of toothings (34, 74, 51, 52) on the one hand, and from the raceways (164, 165) on the other hand, is always situated above a bearing point (P) of the means for pressure.

2. The pressing device as claimed in claim 1, wherein the bearing point (P) is situated below the toothed sector (75) of the control rack (7).

3. The pressing device as claimed in claim 1, wherein the pressure means consist of a helical spring housed in an internal wall of the cylinder block (100).

4. The pressing device as claimed in claim 1, wherein the means for pressure comprises least one Belleville washer housed in an internal wall of the cylinder block (100).

5. The pressing device as claimed in claim 1, wherein the control rack (7) of which a vertical position with respect to the cylinder block (100) is governed by a control device (12) comprising a control jack (8) formed from an upper jack rod (10), a lower jack rod (16), a jack piston (13) and a control rod (20).

6. The pressing device as claimed in claim 5, wherein the jack piston (13) of the control jack (8) comprises a ring (180) with an inner surface (181) matches a spherical shape of said jack piston (13) and with an outer surface (182) which is cylindrical.

7. The pressing device as claimed in claim 1, wherein the means for pressure secured to the cylinder block (100) exert a pressure force on the control rack (7) by way of a bearing ball joint (150) through which is exerted the pressure force which is applied to the bearing surface (78) formed on the lower portion of said rack (7).

8. The pressing device as claimed in claim 1, wherein the means for pressure secured to the cylinder block (100) comprise an adjustable stop which makes it possible to adjust a maximum clearance between the raceways (48, 160 to 165) of the main moving components (3, 5, 7, 40) of the engine.

9. The pressing device as claimed in claim 8, wherein the adjustable stop is a part bolted into the cylinder block (100) that is locked against rotation.

10. A pressing device which maintains raceways (48, 160 to 165) of main moving components (3, 5, 7, 40) of a variable volumetric ratio engine permanently in contact with one another and with faces on which they bear in a cylinder block, comprising:
  means for pressure secured to the cylinder block (100) that exert a pressure force on a control rack (7) comprising a toothed sector (75) having teeth (74), and pressure force is applied to a bearing surface (78) formed on a lower portion of said rack (7),
  wherein the means for pressure are formed from a hydraulic pressing ram (170) housed in an internal wall of the cylinder block (100).

11. The pressing device as claimed in claim 10, wherein the hydraulic pressing ram (170) is a leaktight hydraulic capsule formed from a flexible diaphragm.

12. The pressing device as claimed in claim 10, wherein the hydraulic pressing ram (170) comprises a piston (171) which moves in a cylinder directly machined into the cylinder block (100).

13. The pressing device as claimed in claim 10, wherein the hydraulic pressing ram (170) comprises a piston (171) which moves in a cylindrical sleeve (172) fitted into the cylinder block (100).

14. The pressing device as claimed in claim 10, wherein a bottom of the cylinder of the hydraulic pressing ram (170) is formed by the cylinder block (100).

15. The pressing device as claimed in claim 10, wherein a bottom of the cylinder of the hydraulic pressing ram (170) is an add-on component (173) bolted from outside the cylinder block (100) into said cylinder block (100).

16. The pressing device as claimed in claim 10, wherein oil chambers (179) of the various hydraulic pressing rams (170) belonging to the engine are interconnected by ducts produced within a mass of the cylinder block (100).

17. The pressing device as claimed in claim 10, wherein the pressure prevailing in the hydraulic pressing ram (170) is slaved to operating conditions of the engine by means of a hydraulic unit (200).

18. The pressing device as claimed in claim 17, wherein the hydraulic unit (200) is an autonomous and independent assembly which can be installed at any point of the engine compartment of the vehicle and which is connected to the engine by at least one flexible hydraulic duct.

19. The pressing device as claimed in claim 17, wherein the hydraulic unit (200) comprises at least one hydraulic pump (201).

20. The pressing device as claimed in claim 19, wherein the hydraulic unit (200) comprises a main accumulator (204) which is supplied by the hydraulic pump (201) and which constitutes a high-pressure oil reserve.

21. The pressing device as claimed in claim 19, wherein the hydraulic pump (201) is a single radial piston pump comprising a piston (218) which is actuated translationally along a longitudinal axis of the piston (218) in one direction by a pump drive eccentric (214) and in the other direction by a return spring (219).

22. The pressing device as claimed in claim 21, wherein the pump drive eccentric (214) is formed at the end of one of camshafts which serve to open and close valves of the engine.

23. The pressing device as claimed in claim 21, wherein the pump drive eccentric (214) comprises a ball bearing or roller bearing (215) of which an inner cage (232) is mounted on said eccentric and of which an outer cage (216) is directly or indirectly in contact with an end of the pump piston (218).

24. The pressing device as claimed in claim 21, wherein the pump drive eccentric (214) acts on the pump piston (218) by way of a tappet (217) housed in a bore (233).

25. The pressing device as claimed in claim 21, wherein the hydraulic unit (200) comprises a main accumulator (204) which is supplied by the hydraulic pump (201) and which constitutes a high-pressure oil reserve, and the single radial piston pump comprises a pump chamber (220) which communicates, firstly, with an outlet of an intake nonreturn valve (221) of which an inlet is connected to a pressurized lubricating circuit of the engine, secondly, with the inlet of a delivery nonreturn valve (222) of which the outlet is connected to the main accumulator (204) and, thirdly, with the pressurized lubricating circuit of the engine by way of a duct (223) which can be closed off by a discharge distributor (224).

26. The pressing device as claimed in claim 25, wherein the discharge distributor (224) comprises at least one fluid passage groove (235), and can move in a bore (225) along its longitudinal axis such that one end of said distributor cooperates with a spring (226) which tends to maintain said distributor in a closed position, while the other end of said distributor cooperates with a pressure transmission rod (227) which tends to maintain said distributor in an open position by exerting a force on said distributor, said force being proportional to the pressure prevailing in the main accumulator (204).

27. The pressing device as claimed in claim 26, wherein the pressure transmission rod (227) comprises a first end which is in contact with the discharge distributor (244) and tends to maintain in the open position, while the second end terminates in a pressure chamber (228) connected to the main accumulator (204) by a duct (234).

28. The pressing device as claimed in claim 26, wherein the discharge distributor (224) comprises a locking device (229) which cooperates with two locking grooves (230) respectively enabling said distributor to be maintained in the fully open or fully closed position, said locking device (229) being maintained in one or other of said grooves (230) by a locking spring (231).

29. The pressing device as claimed in claim 17, wherein the hydraulic unit (200) comprises at least one pressure accumulator (204, 206, 209).

30. The pressing device as claimed in claim 17, wherein the hydraulic unit comprises at least one electrohydraulic valve (207, 208).

31. The pressing device as claimed in claim 17, wherein the hydraulic unit (200) comprises at least one sensor (211) for measuring the pressure.

32. The pressing device as claimed in claim 17, wherein the hydraulic unit (200) comprises at least one contactor (205) slaved to the pressure.

33. The pressing device as claimed in claim 17, wherein the hydraulic unit (200) comprises at least one hydraulic relief valve (210).

34. The pressing device as claimed in claim 17, wherein the hydraulic unit (200) comprises at least one oil filter (212).

35. The pressing device as claimed in claim 17, wherein the hydraulic unit (200) is supplied with oil from an engine lubricating circuit.

36. The pressing device as claimed in claim 29, wherein the hydraulic unit (200) comprises a slave accumulator (206) which is connected to the hydraulic pressing ram (170) and the average pressure of which is slaved to the operating conditions of the engine.

37. The pressing device as claimed in claim 29, wherein the hydraulic unit (200) comprises a leak-compensating accumulator (209) which is connected to a nonreturn valve (185) of a control jack (8), said valve (185) allowing hydraulic fluid to enter the body of the control jack.

38. The pressing device as claimed in claim 37, wherein the nonreturn valve (185) of the control jack (8) is placed at the center of an upper rod (10) of said jack, an inlet of said nonreturn valve (185) being in communication with a chamber (184) formed in a cylinder head (113) of said control jack (8) and in continuation of said upper rod (10), said chamber (184) being connected to the leak-compensating accumulator (209) by one duct and the outlet of said nonreturn valve (185) being connected to another duct (187) formed in a jack piston (13) of the control jack (8) through which a control rod (20) crosses said piston.

39. The pressing device as claimed in claim 38, wherein various chambers (184) formed in the cylinder head (113) of the control jacks (8) of one and the same engine and in the continuation of the upper jack rods (10) are interconnected by ducts produced within a mass of said cylinder head (113).

40. The pressing device as claimed in claim 38, wherein the chamber (184) formed in the cylinder head (113) of the control jack (8) and in the continuation of the upper jack rod (10) is connected to another chamber (186) produced above the control rod (20) and in the cylinder head (113) by way of a duct formed within a mass of said cylinder head (113).

* * * * *